(12) United States Patent
Mabu et al.

(10) Patent No.: US 8,869,379 B2
(45) Date of Patent: Oct. 28, 2014

(54) METHOD FOR PRODUCING ROTOR (75) Inventors: Hirotoshi Mabu, Kitakyushu (JP); Kohei Yoshida, Kitakyushu (JP)

(73) Assignee: Mitsui High-Tec, Inc., Fukuoka (JP)

( * ) Notice: Subject to any disclaimer, the term of this patent is extended or adjusted under 35 U.S.C. 154(b) by 36 days.

(21) Appl. No.: 13/512,997

(22) PCT Filed: Nov. 9, 2010

(86) PCT No.: PCT/JP2010/069961
§ 371 (c)(1),
(2), (4) Date: May 31, 2012

(87) PCT Pub. No.: WO2011/070883
PCT Pub. Date: Jun. 16, 2011

(65) Prior Publication Data
US 2012/0227249 A1   Sep. 13, 2012

(30) Foreign Application Priority Data
Dec. 9, 2009   (JP) .................. 2009-279690

(51) Int. Cl.
H02K 15/02   (2006.01)
H02K 15/12   (2006.01)
H02K 15/03   (2006.01)

(52) U.S. Cl.
CPC ............... *H02K 15/03* (2013.01); *H02K 15/12* (2013.01)
USPC .............. 29/598; 29/596; 29/732; 264/272.2

(58) Field of Classification Search
CPC .. B29C 45/02; B29C 45/14778; H02K 1/276; H02K 15/12
USPC ............ 29/596–598, 732; 264/272.2, 272.14; 310/154–156
See application file for complete search history.

(56) References Cited

U.S. PATENT DOCUMENTS

| 5,806,169 | A  | * | 9/1998  | Trago et al. ..................... 29/596 |
| 7,854,056 | B2 | * | 12/2010 | Watanabe et al. ............... 29/598 |
| 7,897,089 | B2 |   | 3/2011  | Matsubayashi et al. |
| 8,020,280 | B2 | * | 9/2011  | Fukumaru et al. .............. 29/598 |
| 8,578,592 | B2 | * | 11/2013 | Nagai et al. ..................... 29/598 |
| 2009/0026867 | A1 |  | 1/2009 | Haruno et al. |
| 2009/0174273 | A1 | * | 7/2009 | Watanabe et al. ........ 310/156.53 |

FOREIGN PATENT DOCUMENTS

| JP | 3786946    | 3/2006  |
| JP | 2007-215301 | 8/2007 |
| JP | 2007-236020 | 9/2007 |
| JP | 2004-357347 | 12/2007 |

OTHER PUBLICATIONS

English language translation of JP2004-357347 dated Dec. 16, 2007.

* cited by examiner

*Primary Examiner* — Minh Trinh
(74) *Attorney, Agent, or Firm* — Greenblum & Bernstein, P.L.C.

(57) ABSTRACT

A method of producing a rotor includes crimping and stacking a plurality of core pieces through crimping connecting portions to form a rotor stacked core having a magnet-insertion hole and inserting a permanent-magnet pieces into the magnet-insertion hole.

Further, the method also includes clamping the rotor stacked core between an upper die and a lower die, and filling a resin into the magnet-insertion hole from a resin reservoir pot which is formed in the upper die or the lower die. Also, the resin may be filled into the magnet-insertion hole while placing the crimping connecting portions at a center of the resin reservoir pot.

6 Claims, 6 Drawing Sheets

METHOD FOR PRODUCING ROTOR

TECHNICAL FIELD

The present invention relates to a method and apparatus for producing a rotor in which permanent-magnet pieces are inserted into a plurality of magnet-insertion holes formed in a rotor stacked core (or a rotor core), respectively, and fixed by a thermosetting resin (for example, by an epoxy resin).

BACKGROUND ART

A technique (a magnet molding method) in which permanent-magnet pieces are inserted into magnet-insertion holes disposed in a rotor stacked core, and fixed by a resin is known in, for example, Patent Literature 1 . In the magnet molding method, during a resin molding process, the rotor stacked core is clamped with upper and lower dies, and the resin is filled from the surface of the rotor stacked core in the magnet-insertion holes into which the permanent-magnet pieces are inserted. However, the method has a problem in that the surface of the rotor stacked core is deformed by: 1) the pressing pressure in the formation of crimping projections; 2) the pressure when the rotor stacked core is die-clamped with the upper and lower dies; 3) the pressure in the filling of the resin; and the like, gaps are formed between the rotor stacked core and the upper and lower dies, and the resin leaks through the gaps.

In the axial direction of the rotor stacked core, parts where a crimping dowel (connecting portion) is formed are crimped, and hence have the highest density. Even when the crimping connecting portions are pressed, therefore, the rotor stacked core is hardly deformed. Consequently, it is known that the positions of a die and a rotor stacked core are set in such a manner that culls (resin reservoir pots including a resin extruding cylinder) formed in the are placed at positions where crimping connecting portions having the highest density in the rotor stacked core are formed, whereby the deformation of the surface of the rotor stacked core which may occur in die clamping and resin filling is prevented from occurring (Patent Literature 2).

CITATION LIST

Patent Literature

Patent Literature 1: Japanese Patent No. 3,786,946
Patent Literature 2: JP-A-2007-215301 (described in Paragraphs [0015] to [0017])

SUMMARY OF INVENTION

Technical Problem

Figure 5:
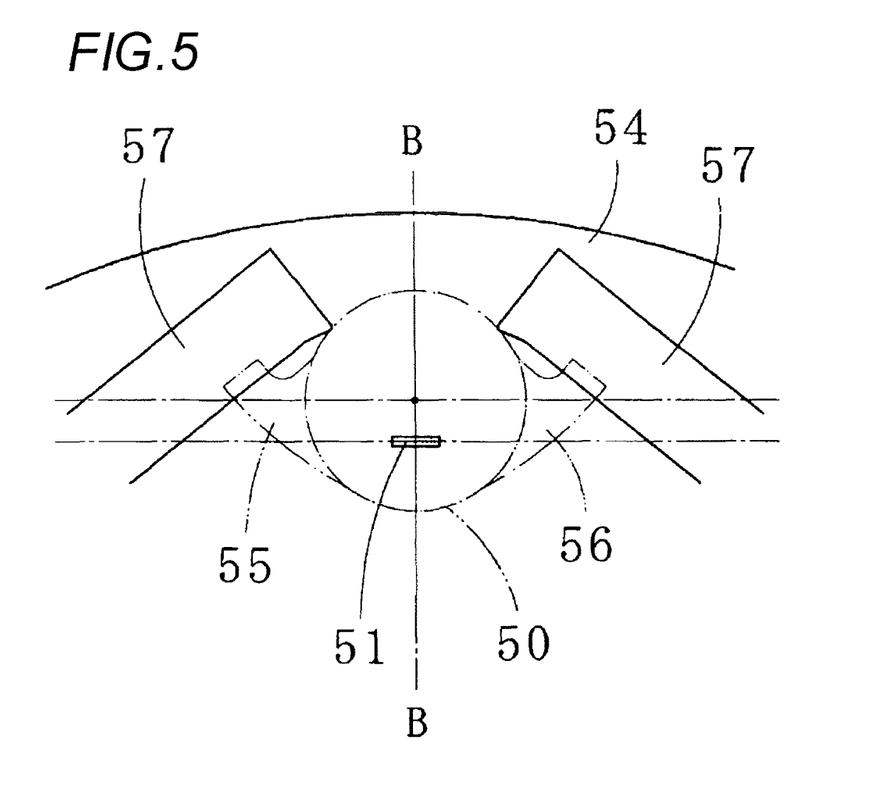
FIG. 5 is a partial plan view illustrating a method of producing a rotor according to a conventional example.
Figure 6:
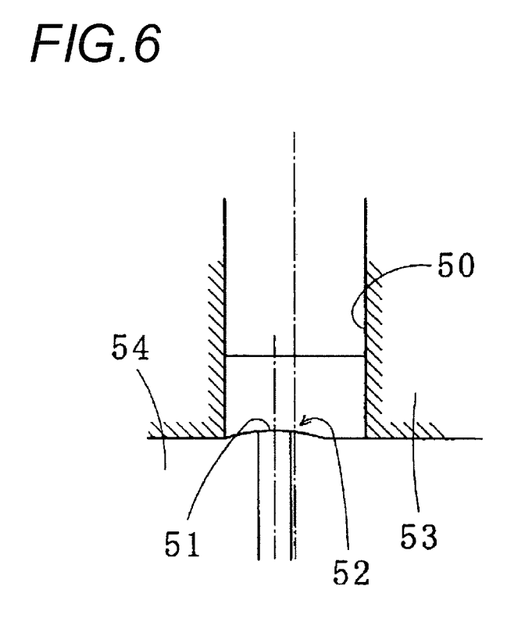
FIG. 6 is a sectional view taken along B-B in FIG. 5.

In the case where a cull 50 is placed at a position which is eccentric with respect to a crimping connecting portion 51 as shown in FIGS. 5 and 6, however, the surface of an upper the 53 cannot be closely contacted with a swell (or depression) 52 in the periphery of the crimping connecting portion 51. As a result, a small gap is formed between the surface of a rotor stacked core 54 and the upper die 53, and there arises a possibility that resin leakage may occur during a resin sealing process. In the figure, the reference numerals 55 and 56 each denote a runner (a resin flow path) which is formed on the rear surface of the upper the 53, and the reference numeral 57 denotes a magnet-insertion hole.

The present invention has been conducted in view of the above-discussed circumstances. It is an object of the invention to provide a method and apparatus for producing a rotor wherein, even when small concave and convex portions are caused to be formed on the surface of a rotor stacked core by crimping connecting portions (i.e., crimping projections and swells or depressions formed in the periphery thereof) formed in the rotor stacked core, resin leakage is prevented from occurring during a resin sealing process.

Solution to Problem

In order to achieve the above object, the present invention provides a method of producing a rotor in which the rotor is produced, the method including:

crimping and stacking a plurality of core pieces through crimping connecting portions to form a rotor stacked core having a magnet-insertion hole;

inserting a permanent-magnet pieces into the magnet-insertion hole;

clamping the rotor stacked core between an upper the and a lower die; and filling a resin into the magnet-insertion hole from a resin reservoir pot which is formed in the upper the or the lower die, wherein the resin is filled into the magnet-insertion hole while placing the crimping connecting portions at a center of the resin reservoir pot.

The method of producing the rotor may be configured so that centers of the crimping connecting portions are made coincident with the center of the resin reservoir pot.

The method of producing the rotor may be configured so that the resin reservoir pot and the magnet-insertion hole are connected to each other through runners. Further, it may be configured so that the resin is filled into a part of the magnet-insertion hole directly from the resin reservoir pot.

The method of producing the rotor may be configured so that a plural set of magnet-insertion hole pairs are disposed, each set having a pair of the magnet-insertion holes, each of the magnet-insertion hole pairs is formed so that, as seen from an axial direction of the rotor stacked core, a distance between respective radially-inner end portions is larger than a distance between respective radially-outer end portions, and the crimping connecting portions are disposed radially inward with respect to middles of the magnet-insertion hole pairs.

The method of producing the rotor may be configured so that a diameter of the resin reservoir pot is in a range of 3 to 10 times a maximum width of the crimping connecting portions. According to the configuration, swells or depressions due to the formation of the crimping connecting portions can be set in the resin reservoir pot.

The method of producing the rotor may be configured so that a depression due to the crimping connecting portions is formed on a surface of the rotor stacked core, the surface being contacted with the upper die or the lower die in which the resin reservoir pot is formed.

In order to achieve the above object, the present invention also provides an apparatus for producing a rotor in which a rotor stacked core in which a plurality of core pieces are crimped and stacked through crimping connecting portions, and permanent-magnet pieces are inserted into respective magnet-insertion holes is clamped between an upper die and a lower die, and a resin is filled into the magnet-insertion holes from a resin reservoir pot which is formed in the upper die or the lower die, wherein the apparatus is configured to fill the resin into the magnet-insertion holes while making centers of the crimping connecting portions coincident with a center of the resin reservoir pot.

The method of producing the rotor may be configured so that the resin reservoir pot is disposed in the upper die. When the resin reservoir pot is disposed in the upper die, the filling of the resin (for example, a thermosetting resin) into the magnet-insertion holes is facilitated.

Advantageous Effects of Invention

In the method and apparatus for producing a rotor according to the invention, the placement of the crimping connecting portions at the center of the resin reservoir pot enables swells or depressions in the peripheries of dowels to be located within the areas of the resin reservoir pot. The upper or lower die in which the resin reservoir pot is formed can press regions having high parallelism (i.e., regions in which there is no difference in height, and which are close to a flat plane) in the surface of the rotor stacked core. Therefore, a gap that is formed between a conventional rotor stacked core and an upper or lower die in which a resin reservoir pot is formed is eliminated, and resin leakage can be prevented from occurring.

Moreover, the resin reservoir pot is placed so that the centers of the crimping connecting portions are coincident with that of the resin reservoir pot. Therefore, swells or depressions in the peripheries of the crimping connecting portions can be caused to be located more surely within the resin reservoir pot.

Even if the peripheries of the crimping connecting portions are somewhat depressed by the pressure in the resin sealing process, the coincidence of the centers of the crimping connecting portions with that of the resin reservoir pot allows the depressions in the peripheries of the crimping connecting portions to be located within the area of the resin reservoir pot, and the upper or lower die in which the resin reservoir pot is formed can press a region having high parallelism in the surface of the rotor stacked core. Therefore, resin leakage can be prevented from occurring.

MODES FOR CARRYING OUT INVENTION

Figure 1:
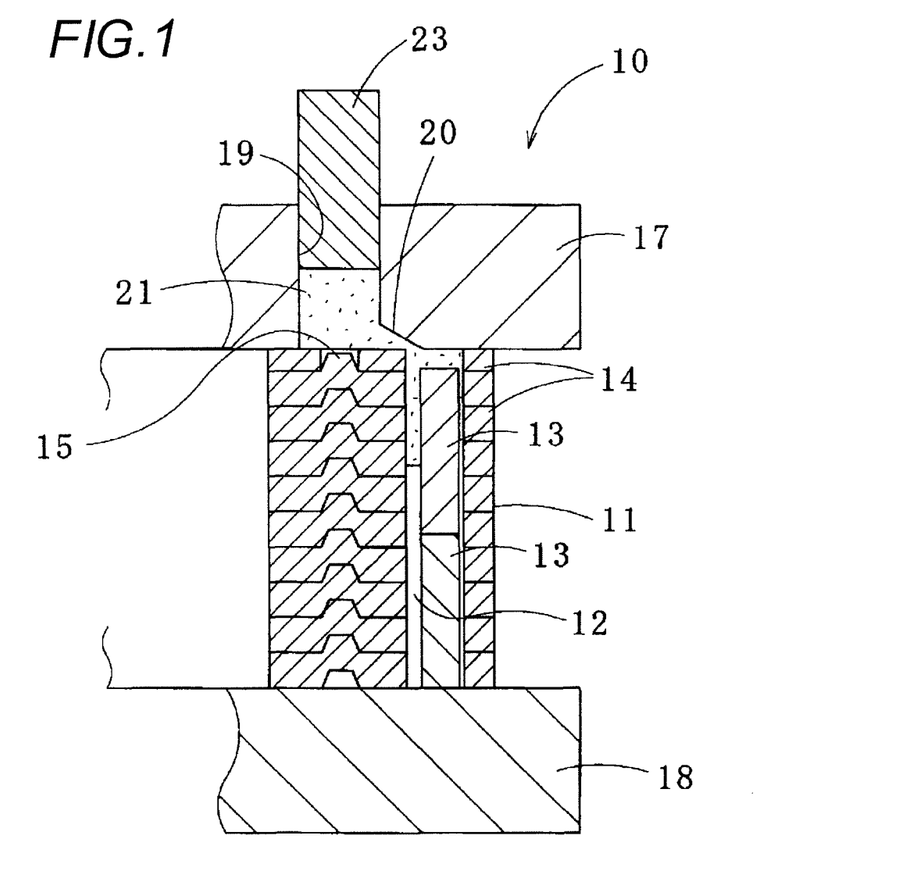
FIG. 1 is a partially longitudinal sectional view of an apparatus for producing a rotor according to an embodiment of the invention.
Figure 2:
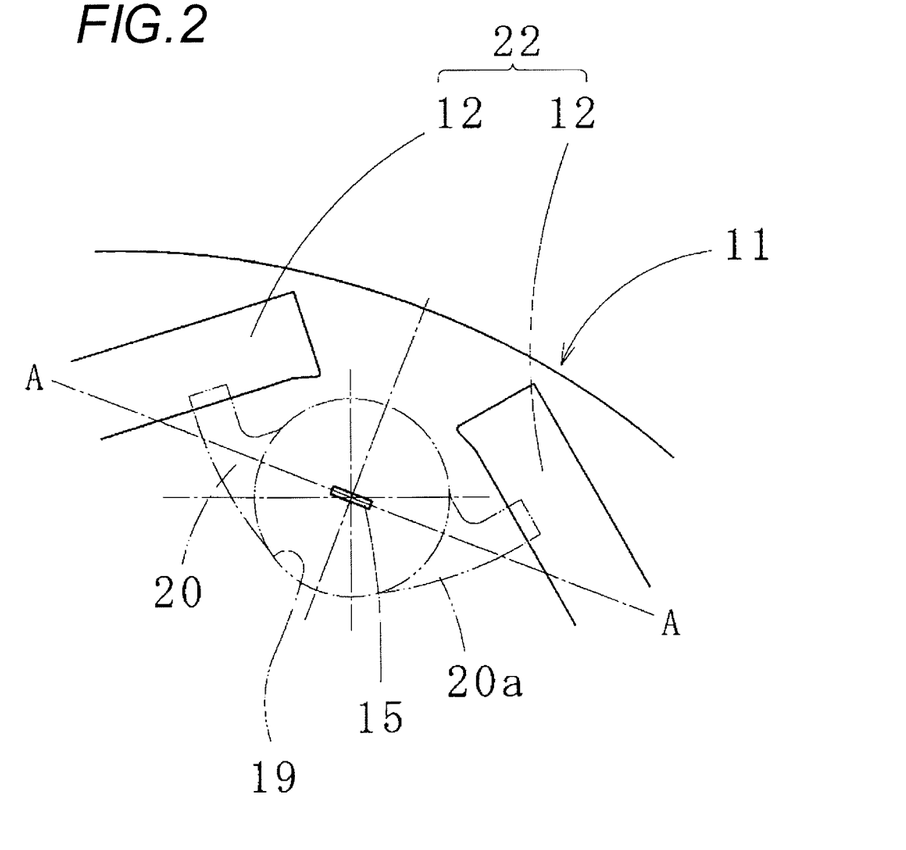
FIG. 2 is a partial plan view illustrating a method of producing the rotor according to the embodiment of the invention.

As shown in FIGS. 1 and 2, in an apparatus 10 for producing a rotor according to an embodiment of the invention, it is possible to resin-seal permanent-magnet pieces 13 which are not energized, and which are inserted into a plurality of magnet-insertion holes 12 disposed in the periphery of a center axial hole of a rotor stacked core 11. In the embodiment, the rotor stacked core 11 is placed in such a manner that crimping connecting portions (crimping projections) 15 which couple up and down core pieces 14 together are directed toward an upper die 17.

The rotor stacked core 11 is a cylindrical member in which the plurality of core pieces 14 are crimped and stacked through the crimping connecting portions 15. Each of the crimping connecting portions 15 includes a projection which is projected in one axial direction (in the embodiment, the upward direction) of the rotor stacked core 11, and a recess which is formed on the rear surface of the projection. The plurality of core pieces 14 are coupled to one another by, in a state where the projection of the crimping connecting portion 15 disposed in one core piece 14 coincides with the recess of the crimping connecting portion 15 disposed in the core piece 14 which is stacked on the one core piece 14, applying a pressure vertically (in the axial direction of the rotor stacked core 11), and crimping the projections and recesses of the crimping connecting portions 15.

In the resin sealing process applied to the magnet-insertion holes 12 into which the permanent-magnet pieces 13 are inserted, in a state where the rotor stacked core 11 is clamped with the upper die 17 and a lower die 18, an epoxy resin 21 which is an example of a sealing resin is filled into the magnet-insertion holes 12 from a resin reservoir pot (cull) 19 formed in the upper die 17, through runners 20, 20a formed in the upper die 17, thereby sealing the magnet-insertion holes 12.

Here, the center of the resin reservoir pot 19 which is formed in the upper die 17, and which has a circular sectional shape is formed radially inward with respect to the a middle of each of magnet-insertion hole pairs 22 of the rotor stacked core 11, and coincide with the centers of the crimping connecting portions 15. Each of the magnet-insertion hole pairs 22 is formed so that, as seen in the axial direction of the rotor stacked core 11, the distance between the radially-inner end portions of the holes is wider than that between the radially-outer end portions, thereby allowing the holes to constitute a "/\"-like shape (an inverted V-like shape in which the bottom of an English character is cut away, a shape similar to "ノ\" of a Chinese character). The crimping connecting portions 15 mean swells (in some situations, recesses) which are formed by crimps that are rectangular as seen in the axial direction, and that have a V-like shape as seen in an axial section, or crimps that are circular as seen in the axial direction.

Figure 3:
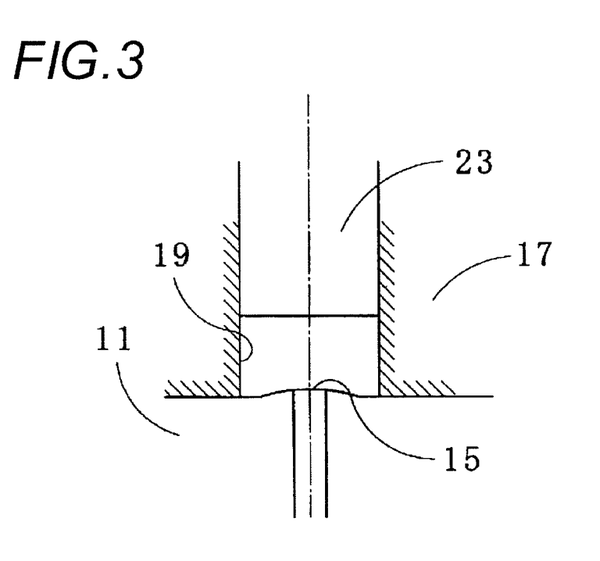
FIG. 3 is a sectional view taken along A-A in FIG. 2.

The resin reservoir pot 19 has a diameter which is 3 to 10 times (more preferably, 4 to 8 times) the maximum width of the crimping connecting portions 15. During a process of forming the crimping connecting portion 15 in the core piece 14 which has a hollow-disk-like shape, as shown in FIG. 3, the surface of the rotor stacked core 11 in the periphery of the crimping connecting portion 15 is deformed so as to be upward swollen. The swell in the periphery of the crimping connecting portion 15 is formed in the resin reservoir pot 19, and symmetrically about the center of the resin reservoir pot 19. Therefore, the swell in the periphery of the crimping connecting portion 15 can be located within the area of the resin reservoir pot 19, and no gap through which the resin may leak is formed between the periphery of the resin reservoir pot 19 and the surface of the rotor stacked core 11.

Then, a method of producing a rotor according to the embodiment of the invention will be described.

In the case where the rotor stacked core 11 is to be resin-sealed by using the apparatus 10 for producing the rotor, the permanent-magnet pieces 13 are inserted into the magnet-insertion holes 12 of the rotor stacked core 11, the rotor stacked core 11 is placed between the upper die 17 and the lower die 18, and the rotor stacked core 11 is located so that the center of the resin reservoir pot 19 disposed in the upper die 17 coincide with the center positions of the crimping connecting portions 15 formed in the rotor stacked core 11.

In the embodiment, the rotor stacked core 11 is placed between the upper die 17 and the lower die 18 in such a manner that the projections of the crimping connecting portions 15 of the core pieces 14 are upward directed. Alternatively, the rotor stacked core 11 may be placed between the upper die 17 and the lower die 18 while being carried on a transport tray (for example, disclosed in Japanese Patent No. 3,786,946). The transport tray has a unit for positioning the rotor stacked core 11.

After the rotor stacked core 11 is clamped with the upper die 17 and the lower die 18, an epoxy resin is introduced into the resin reservoir pot 19 of the upper die 17, and melted, and a plunger 23 pushes the molten epoxy resin 21 from the upper side to introduce the resin into the magnet-insertion holes 12 through the runners 20, 20a.

In this case, since the center of the resin reservoir pot 19 coincide with the center positions of the crimping connecting portions 15 formed in the rotor stacked core 11, the swell due to the crimping connecting portions 15 is covered with the resin reservoir pot 19, there occurs no gap formed between the upper die 17 and the surface of the rotor stacked core 11, and the occurrence of resin leakage is eliminated.

Figure 4:
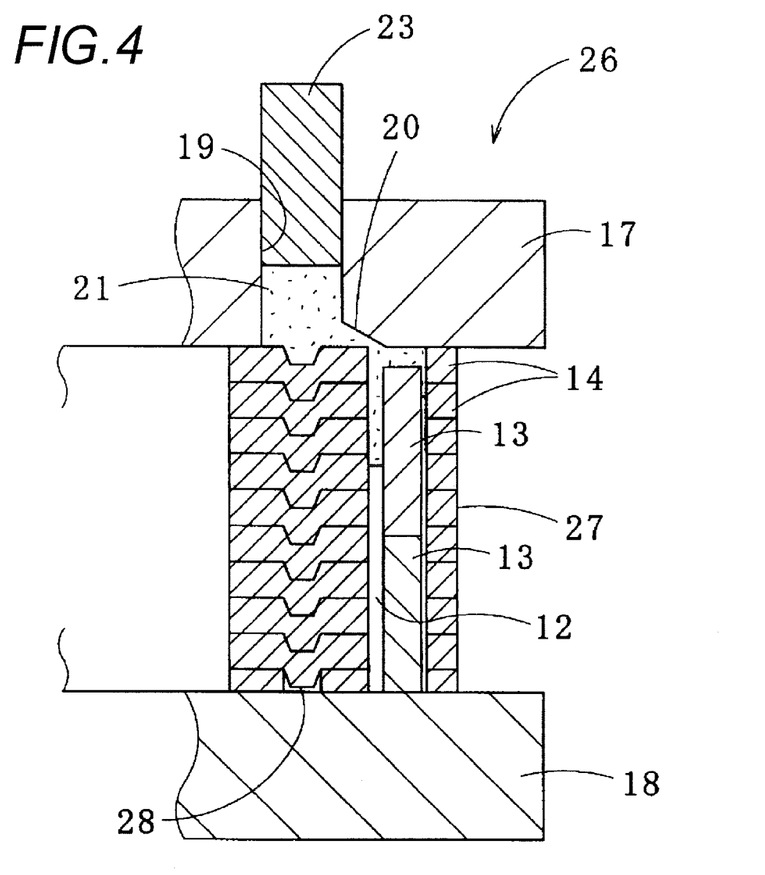
FIG. 4 is a partially longitudinal sectional view of an apparatus for producing a rotor according to another embodiment of the invention.

FIG. 4 shows an apparatus 26 for producing a rotor according to another embodiment of the invention. The elements identical to those of FIG. 1 are denoted by the same reference numerals, and their description is omitted. In the embodiment, a rotor stacked core 27 is placed in such a manner that projections of crimping connecting portions 28 of the core pieces 14 are directed toward a lower die, depressions (in some situations, swells) are formed in the peripheries of the crimping connecting portions 28 of the upper surface of the rotor stacked core 27.

Also in the embodiment, the crimping connecting portions 28 are placed at the center of the resin reservoir pot 19. In the case where the rotor stacked core 27 is die-clamped with the upper die 17, therefore, the peripheries of the resin reservoir pot 19 are formed as a plane surface, and, even when the resin sealing process is performed after die clamping, resin leakage does not occur.

As shown in FIG. 4, the resin reservoir pot 19 is placed on the surface (in the figure, the upper surface) of the rotor stacked core 27 on the side where the depression due to the crimping connecting portion 28 is formed. Therefore, the lower face of the upper the 17 and the surface of the rotor stacked core 27 are easily closely contacted with each other, and a gap through which the resin may leak is hardly formed.

As shown in FIG. 1, by contrast, the swells due to the crimping connecting portions 18 have a higher rigidity, but correspondingly it is difficult to form a close contact with respect to the upper die 17. Therefore, resin leakage is easily caused unless the resin reservoir pot 19 is made larger so that the swells which are formed in the peripheries of the crimping connecting portions 15 are located substantially completely within the area of the resin reservoir pot 19. Consequently, it is preferable to locate the depressions which are caused by the formation of the crimping connecting portions 15, in the resin reservoir pot 19 while directing the projecting directions of the projections of the crimping connecting portions 15 toward the direction opposite to the resin sealing side.

The invention is not limited to the above-described embodiments. In the case where the number, shape, or placement of the magnet-insertion holes is changed without changing the spirit of the invention, the invention may be applied even to a case where the runners are not disposed and the resin is filled directly from the resin reservoir pot into the magnet-insertion holes.

Although, in the embodiments, the resin reservoir pots (culls) are disposed in the upper die, the invention may be applied also to a case where the resin reservoir pots are disposed in the lower die and the resin is filled from the lower side of the magnet-insertion holes.

Although the invention has been described in detail and with reference to the specific embodiments, it is obvious to those skilled in the art that various changes and modifications can be made without departing from the spirit and scope of the invention.

The present application is based on Japanese Patent Application (No. 2009-279690) filed on Dec. 9, 2009, the contents of which are incorporated herein by reference.

Industrial Applicability

According to the method and apparatus for producing a rotor in the invention, the placement of the crimping connecting portions at the center of the resin reservoir pot enables swells or depressions in the peripheries of dowels to be located within the area of the resin reservoir pot. The upper or lower die in which the resin reservoir pots are formed can press regions having higher parallelism (i.e., regions in which there is no difference in height, and which are close to a flat plane) in the surface of the rotor stacked core. Therefore, a gap that is formed between a conventional rotor stacked core and an upper or lower die in which a resin reservoir pot is formed is eliminated, and resin leakage can be prevented from occurring.

Moreover, the resin reservoir pot is placed so that the centers of the crimping connecting portions are coincident with that of the resin reservoir pot. Therefore, swells or depressions in the peripheries of the crimping connecting portions can be caused to be located more surely within the resin reservoir pot.

REFERENCE SIGNS LIST

10: apparatus for producing rotor, 11: rotor stacked core, 12: magnet-insertion hole, 13: permanent-magnet piece, 14: core piece, 15: crimping connecting portion, 17: upper die, 18: lower die, 19: resin reservoir pot (cull), 20, 20a: runner, 21: epoxy resin, 22: magnet-insertion hole pair, 23: plunger, 26: apparatus for producing rotor, 27: rotor stacked core, 28: crimping connecting portion

The invention claimed is:

1. A method of producing a rotor in which the rotor is produced, the method comprising:
    crimping and stacking a plurality of core pieces through crimping connecting portions to form a rotor stacked core having a magnet-insertion hole;
    inserting a permanent-magnet pieces into the magnet-insertion hole;
    clamping the rotor stacked core between an upper die and a lower die; and
    filling a resin into the magnet-insertion hole from a resin reservoir pot which is formed in the upper die or the lower die, wherein
    the resin is filled into the magnet-insertion hole while placing the crimping connecting portions at a center of the resin reservoir pot.

2. The method of producing the rotor according to claim 1, wherein
  centers of the crimping connecting portions are made coincident with the center of the resin reservoir pots.

3. The method of producing the rotor according to claim 1, wherein
  the resin reservoir pot and the magnet-insertion hole are connected to each other through runners.

4. The method of producing the rotor according to claim 1, wherein
  a plural set of magnet-insertion hole pairs are disposed, each set having a pair of the magnet-insertion holes,
  each of the magnet-insertion hole pairs is formed so that, as seen from an axial direction of the rotor stacked core, a distance between respective radially-inner end portions is larger than a distance between respective radially-outer end portions, and
  the crimping connecting portions are disposed radially inward with respect to middles of the magnet-insertion hole pairs.

5. The method of producing the rotor according to claim 1, wherein
  a diameter of the resin reservoir pot is in a range of 3 to 10 times a maximum width of the crimping connecting portions.

6. The method of producing the rotor according to claim 1, wherein
  a depression due to the crimping connecting portions is formed on a surface of the rotor stacked core, the surface being contacted with the upper die or the lower die in which the resin reservoir pot is formed.

* * * * *